(12) United States Patent
Knapp et al.

(10) Patent No.: US 10,962,117 B2
(45) Date of Patent: Mar. 30, 2021

(54) BRUSH SEAL WITH SPRING-LOADED BACKING PLATE

(71) Applicant: UNITED TECHNOLOGIES CORPORATION, Farmington, CT (US)

(72) Inventors: James N Knapp, Sanford, ME (US); Timothy M Davis, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 379 days.

(21) Appl. No.: 15/845,352

(22) Filed: Dec. 18, 2017

(65) Prior Publication Data

US 2019/0186634 A1 Jun. 20, 2019

(51) Int. Cl.
*F16J 15/3288* (2016.01)
*F01D 11/00* (2006.01)
*F01D 11/08* (2006.01)

(52) U.S. Cl.
CPC ......... *F16J 15/3288* (2013.01); *F01D 11/005* (2013.01); *F01D 11/08* (2013.01); *F05D 2230/642* (2013.01); *F05D 2240/56* (2013.01); *F05D 2260/38* (2013.01)

(58) Field of Classification Search
CPC ........ F01D 11/005; F01D 11/08; F01D 11/12; F01D 11/125; F01D 11/127; F01D 11/122; F05D 2240/56; F05D 2230/642; F05D 2260/38; F05B 2240/571; F16J 15/3288
USPC ....................................................... 277/355
See application file for complete search history.

(56) References Cited

U.S. PATENT DOCUMENTS

| | | | | |
|---|---|---|---|---|
| 5,174,582 A | * | 12/1992 | Ferguson | F16J 15/3288 277/355 |
| 5,568,931 A | * | 10/1996 | Tseng | F16J 15/3288 277/355 |
| 6,173,962 B1 | | 1/2001 | Morrison | |
| 8,317,464 B2 | | 11/2012 | Alamsetty et al. | |
| 9,506,566 B2 | | 11/2016 | Saville et al. | |
| 9,879,557 B2 | * | 1/2018 | Hall | F01D 11/005 |
| 2008/0296846 A1 | * | 12/2008 | Daggett | F16J 15/3288 277/355 |
| 2016/0003360 A1 | * | 1/2016 | Klaen | F16J 15/3288 277/355 |
| 2016/0061330 A1 | * | 3/2016 | Davis | B23K 31/02 277/355 |
| 2017/0335705 A1 | * | 11/2017 | Tyler, Jr. | F01D 11/02 |

FOREIGN PATENT DOCUMENTS

| | | |
|---|---|---|
| CN | 20270715 | 3/2012 |
| EP | 1018613 | 7/2000 |

OTHER PUBLICATIONS

European Patent Office, European Search Report dated Oct. 7, 2019 in Application No. 18207612.5.
European Patent Office, European Office Action dated Jun. 25, 2020 in Application No. 18207612.5.

* cited by examiner

*Primary Examiner* — Christopher Verdier
(74) *Attorney, Agent, or Firm* — Snell & Wilmer L.L.P.

(57) ABSTRACT

A brush seal for a gas turbine engine may comprise a spring-loaded support plate and a plurality of bristles located over the spring-loaded support plate. The spring-loaded support plate may comprise a support bar and a plurality of arms extending from the support bar. The support arms may be configured to apply a biasing load to the support bar.

15 Claims, 5 Drawing Sheets

BRUSH SEAL WITH SPRING-LOADED BACKING PLATE

FIELD

The present disclosure relates to seal structures, and, more specifically, to a brush seal with a spring-loaded backing plate.

BACKGROUND

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

The gas turbine engine may have various gas-flow streams that may be kept separate from one another by various components and/or seals. Brush seals may be employed in applications where the seal cavity, within which the brush seal is located, expands and contracts axially due to translation and/or thermal expansion of the components that define the seal cavity. Brush seals may also be employed in applications where there is a high pressure differential between the various gas-flow streams. However, in applications challenged by both axial movement (often referred to as "active seal cavities") and high pressure differentials, current brush seal designs may experience difficulties.

SUMMARY

A brush seal for a gas turbine engine is disclosed herein. In accordance with various embodiments, the brush seal may comprise a plurality of bristles, a backing plate coupled to the plurality of bristles, and a spring-loaded support plate located on the backing plate. The spring-loaded support plate may comprise a support bar and a plurality of arms extending from the support bar. The plurality of arms may be configured to apply a biasing load to the support bar.

In various embodiments, the support bar may be located proximate a distal surface of the backing plate. The plurality of arms may be oriented at an angle of less than 90 degrees relative to a surface of the support bar and the plurality of bristles may be oriented at angle of greater than 90 degrees relative to the surface of the support bar.

In various embodiments, a portion of the backing plate may be located between the plurality of bristles and the plurality of arms. A radial thickness of the support bar may be greater than a radial thickness of the plurality of arms. A portion of the support bar may radially overlap the plurality of arms.

In various embodiments, a distal surface of the support bar may be axially aligned with a distal end of the plurality of bristles. A proximal surface of the plurality of arms may contact a radially extending surface of the backing plate.

A gas turbine engine is disclosed herein. In accordance with various embodiments, the gas turbine engine may comprise a vane and a blade axially adjacent to the vane. A blade outer air seal (BOAS) may be disposed radially outward of the blade. A brush seal may be disposed in a seal cavity defined, at least partially, by the vane and the BOAS. The brush seal may comprise a spring-loaded support plate and a plurality of bristles located over the spring-loaded support plate.

In various embodiments, the spring-loaded support plate may comprise a support bar and a plurality of arms extending from the support bar. The plurality of bristles may be coupled to the support bar. A distal surface of the plurality of arms may be axially aligned with a distal end of the plurality of bristles. The distal surface of the plurality of arms and the distal end of the plurality of bristles may contact a surface of the vane. The support bar may contact a radially extending surface of the BOAS.

In various embodiments, a backing plate may be coupled to the plurality of bristles. A distal surface of the support bar may be aligned axially with a distal end of the plurality of bristles. The distal surface of the support bar and the distal end of the plurality of bristles may contact a surface of the vane. A proximal surface of the plurality of arms may contact a radially extending surface of the backing plate. In various embodiments, a portion of the backing plate may be located between the plurality of bristles and the plurality of arms.

A brush seal is disclosed herein. In accordance with various embodiments, the brush seal may comprise a spring-loaded support plate and a plurality of bristles located over the spring-loaded support plate. The spring-loaded support plate may comprise a support bar and a plurality of arms extending from the support bar.

In various embodiments, the support bar may be coupled to the plurality of bristles. A distal surface of the plurality of arms may be axially aligned with a distal end of the plurality of bristles. In various embodiments, a distal surface of the support bar may be axially aligned with a distal end of the plurality of bristles.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "distal" refers to the direction outward, or generally, away from a reference component. As used herein, "proximate" refers to a direction inwards, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Brush seals as disclosed herein may be located between two engine components, for example, between a vane and a blade outer air seal (BOAS). The brush seal may comprise a spring-loaded support plate configured to compress and decompress in response to axial translation of one or more of the engine components. The spring-loaded support plate may extend to and contact the sealing surface. The spring-loaded support plate may thus support a full length of the bristles of the brush seal, which may decrease or eliminate bristle blow-over at high pressure differentials.

Figure 1:
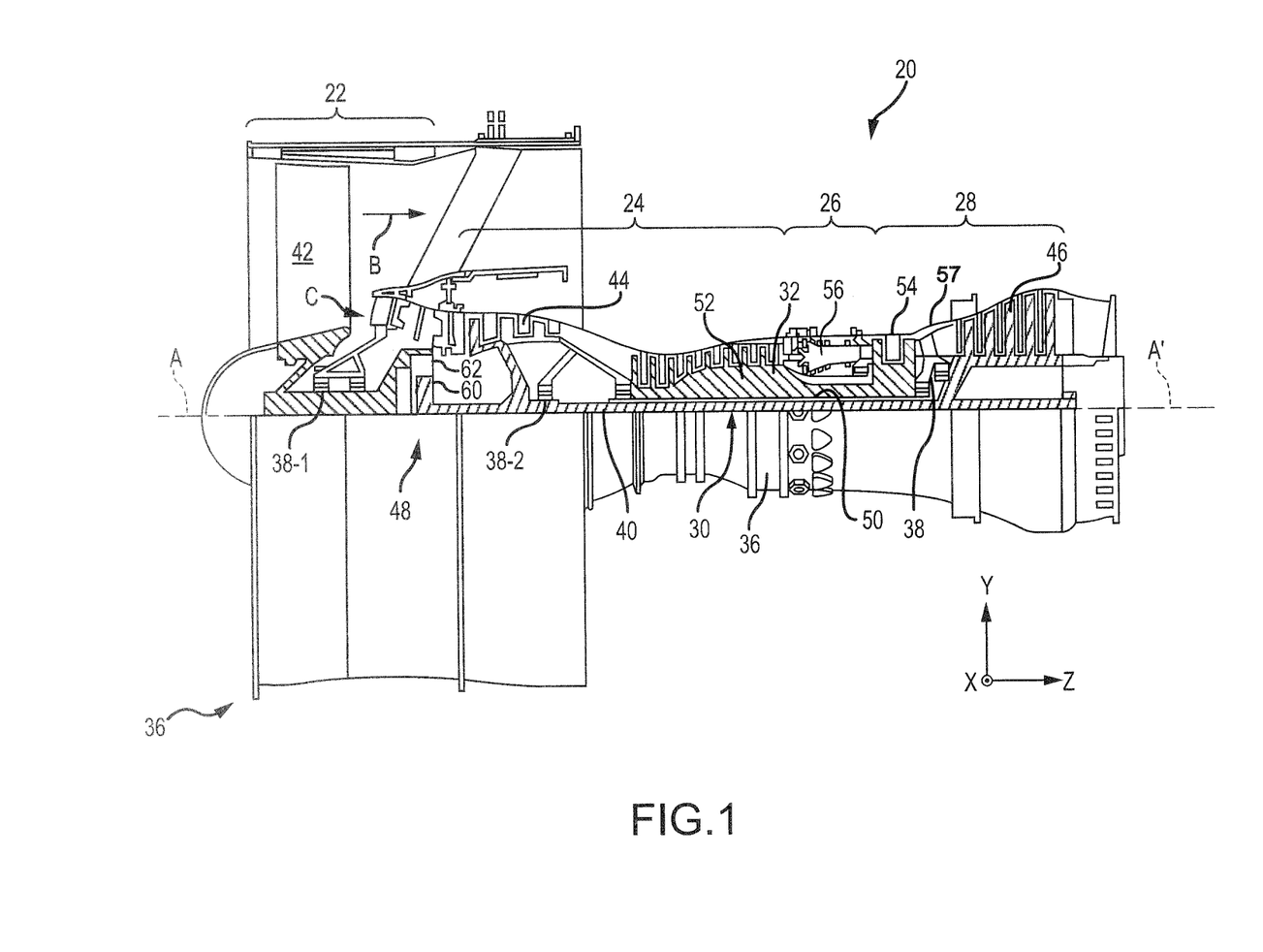
FIG. 1 illustrates an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a path of bypass airflow B while compressor section 24 can drive fluid along a path of core airflow C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of fan 42 may be significantly larger than that of low pressure compressor 44, and low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, or may comprise any gas turbine engine as desired.

Low pressure compressor 44, high pressure compressor 52, low pressure turbine 46, and high pressure turbine 54 may comprise one or more stages or sets of rotating blades and one or more stages or sets of stationary (i.e., non-rotating) vanes axially interspersed with the associated blade stages.

Figure 2:
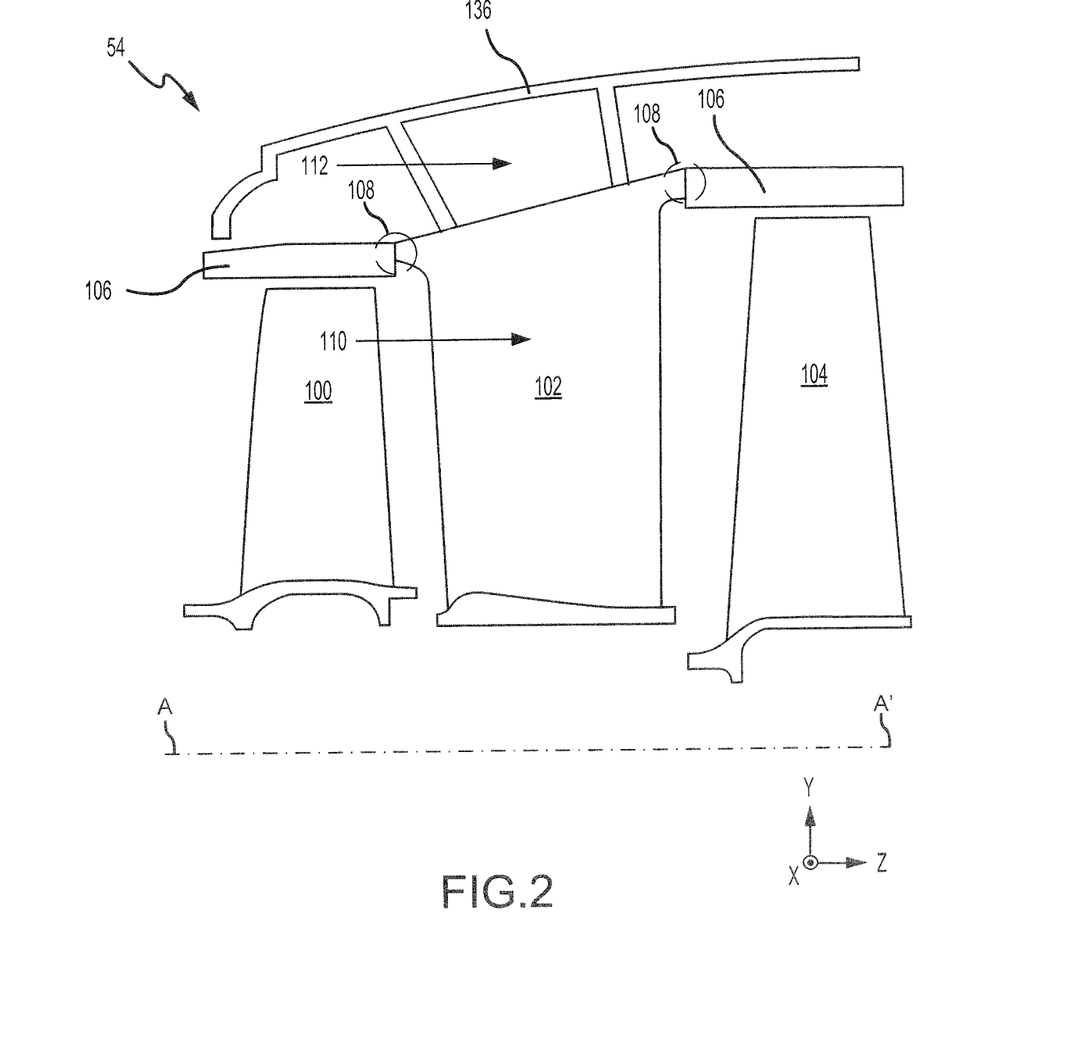
FIG. 2 illustrates a schematic cross-section of a portion of a high pressure turbine section of the gas turbine engine of FIG. 1, in accordance with various embodiments.

With reference to FIG. 2, a portion of high pressure turbine 54 is illustrated, in accordance with various embodiments. High pressure turbine 54 may include a first rotating member or blade 100, a non-rotating member or vane 102, and a second rotating member or blade 104. Blades 100 and 104 may each be configured to rotate about engine central longitudinal axis A-A', in response to receiving a flow of fluid (e.g., air) from combustor section 26 (FIG. 1). Power from the flow may be converted to mechanical power, or torque, by blades 100 and 104.

Vane 102 may be coupled to an engine casing structure 136 or other support structure of high pressure turbine 54. Engine casing structure 136 may form a portion of engine static structure 36 (FIG. 1). Vane 102 may help direct the flow of fluid between blade 100 and blade 104. Vane 102 comprises a static structure that does not rotate relative to engine central longitudinal axis A-A'.

An annular blade outer air seal (BOAS) 106 may be located radially outward from each of blade 100 and blade 104. BOAS 106 may be a static structure (i.e., a structure that does not rotate about engine central longitudinal axis A-A') designed to reduce air leakage over the radially outward portions, or "tips," of blades 100 and 104.

To reduce the flow or leakage of air between BOAS 106 and vane 102, a brush seal may be located in a seal cavity 108 defined, at least partially, by vane 102 and BOAS 106. Although the present disclosure is directed to providing a brush seal between a BOAS and a vane in high pressure turbine 54, one skilled in the art will realize that the brush seal disclosed herein may be equally applicable to low pressure turbine 46, high pressure compressor 52, low pressure compressor 44, and/or other areas of gas turbine engine 20 (FIG. 1) where a seal is desired.

Figure 3A:
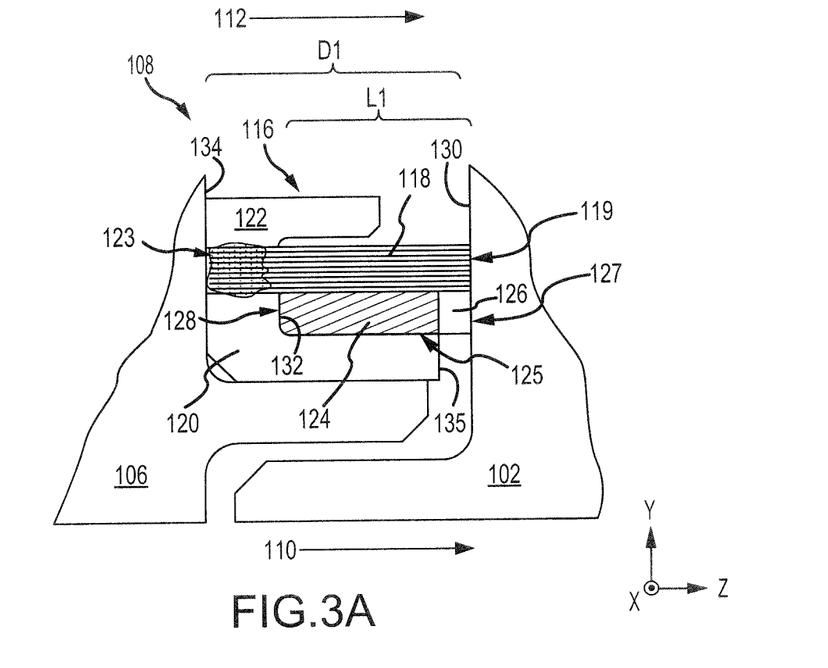
FIGS. 3A and 3B illustrate a brush seal having backing plate with spring-loaded support plate, in accordance with various embodiments.

With reference to FIG. 3A, a brush seal 116 disposed in seal cavity 108 is illustrated, in accordance with various embodiments. With combined reference to FIGS. 2 and 3A, in various embodiments, brush seal 116 may be an annular split ring seal centered about axis of rotation A-A'. In various embodiments, brush seal 116 may be located on BOAS 106 and may form a sealing interface (i.e., be in a sealing engagement) with vane 102. Brush seal 116 may be configured to seal an airflow 110 over vane 102 (e.g., core airflow C of FIG. 1) from an airflow 112 on the opposite, or radially outward, side of brush seal 116 (e.g., bypass airflow B of FIG. 1).

Brush seal 116 comprises a plurality of bristles 118. In various embodiments, bristles 118 may include bristles of varying diameter and/or bristles that lay at varying angles relative to axis of rotation A-A'. Brush seal 116 further comprises a backing plate 120. Backing plate 120 may be disposed radially inward of bristles 118. Backing plate 120 may be an annular structure made of a metal or metal alloy. For example, backing plate 120 may comprise aluminum, copper, nickel, cobalt, titanium, steel, and/or alloys thereof.

Brush seal 116 may further comprise a retention structure (also referred to as a side plate) 122 disposed radially outward of bristles 118. Retention structure 122, bristles 118, and backing plate 120 may be welded or otherwise coupled to one another at a weld 123. In various embodiments, electron-beam (e-beam) welding may be used to form the coupling or weld 123 between retention structure 122, bristles 118, and backing plate 120. The weld 123 may be formed continuously around the circumference of brush seal 116. In various embodiments, retention structure 122, bristles 118, and backing plate 120 may be welded or otherwise joined at an end of brush seal 116 that is distal to the sealing interface. Stated differently, the weld 123 joining retention structure 122, bristles 118, and backing plate 120 may be located generally opposite a distal end 119 of bristles 118. As used here, a "distal end" refers to an end of the bristles that is generally opposite or located away from the welded, or otherwise fixed, portion of the bristles (i.e., "distal end" refers to an end of the bristles that is generally proximate the sealing interface). Distal end 119 of bristles 118 may contact and form a sealing interface along a radially extending surface 130 of vane 102.

Figure 3B:
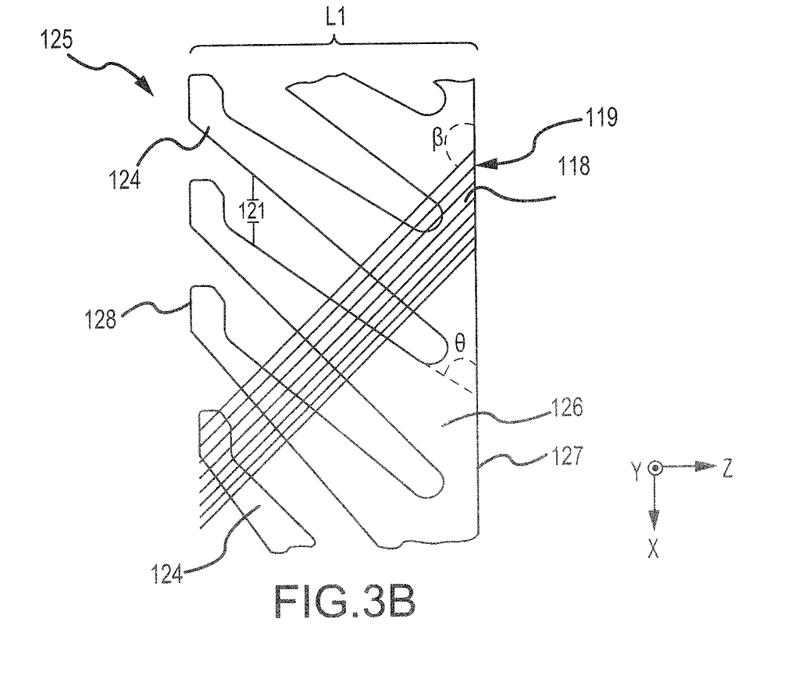

Brush seal 116 may further comprise a spring-loaded support plate 125. In various embodiments, spring-loaded support plate 125 may be located over backing plate 120. FIG. 3B shows a radially inward looking view of spring-loaded support plate 125. It should be understood that for clarity FIG. 3B shows only a portion of the bristles 118 located over spring-loaded support plate 125, and that bristles 118 may cover an entire circumference of spring-loaded support plate 125. Spring-loaded support plate 125 may comprise a support bar 126 and a plurality of arms 124 extending from support bar 126. Support bar 126 may be an annular and/or split ring structure. Arms 124 may extend from support bar 126 in a generally axial direction (e.g., in the negative Z direction). Arms 124 may be integral to support bar 126. Stated differently, spring-loaded support plate 125, including support bar 126 and arms 124, may be cut, stamped, machined, molded, or otherwise formed from a single piece of metal, metal alloy, or other suitable material.

Spring-loaded support plate 125 may comprise a length L1 extending from a proximal surface 128 of arms 124 to a distal surface 127 of support bar 126. Proximal surface 128 may be generally opposite distal surface 127. As used herein, "distal surface" refers to a surface that is generally opposite and/or axially away from the point of attachment of the bristles (e.g., weld 123). Stated differently, the distal surface is generally proximate the sealing interface. As used herein, "proximal surface" refers to a surface that is located proximate and/or axially near the point of attachment of the bristles (e.g., weld 123). Stated differently, the proximal surface is generally distal or opposite to the sealing interface. Arms 124 may be oriented at an angle theta (θ) relative to a distal surface 127 of support bar 126. Bristles 118 may be oriented at an angle beta (β) relative to distal surface 127. Angle β may be selected to be different from angle θ to avoid bristles 118 being aligned with the space or gaps between adjacent arms 124. For example, angle θ may be less than 90 degrees and angle β may be greater than 90 degrees. In various embodiments, angle θ may be between 85 degrees and 40 degrees, and angle β may be between 95 degrees and 150 degrees.

With combined reference to FIGS. 3A and 3B, support bar 126 may be located proximate a distal surface 135 of backing plate 120 and may span, at least, a portion of the space or gap between distal surface 135 of backing plate 120 and radially extending surface 130 of vane 102. Distal surface 127 of support bar 126 may contact radially extending surface 130 of vane 102. Proximal surface 128 of arms 124 may contact a radially extending surface 132 of backing plate 120. In this regard, spring-loaded support plate 125 may extend from radially extending surface 132 of backing plate 120 to radially extending surface 130 of vane 102.

In response to a translation and/or thermal expansion of BOAS 106 and/or vane 102, a distance D1 between radially extending surface 134 of BOAS 106 and radially extending surface 130 of vane 102 may decrease. As distance D1 decreases, an interface between vane 102 and distal surface 127 of support bar 126 forces support bar 126 toward radially extending surface 132 of backing plate 120. As support bar 126 translates toward radially extending surface 132, arms 124 bend and/or compress so that length L1 of spring-loaded support plate 125 decreases. For example, as D1 decreases, the angle θ of arms 124 relative to distal surface 127 may decrease and/or a distance 121 between adjacent arms 124 may decrease, thereby decreasing length L1.

Arms 124 may be configured to apply a biasing load to support bar 126. Arms 124 may apply a biasing load to support bar 126 in a direction toward radially extending surface 130 of vane 102. In this regard, arms 124 may keep distal surface 127 of support bar 126 in contact with radially extending surface 130 of vane 102. For example, as distance D1 increases, arms 124 may naturally unbend and/or decompress so that length L1 of spring-loaded support plate 125 increases and support bar 126 is forced toward radially extending surface 130 of vane 102. Stated differently, as D1 increases, the angle θ of arms 124 relative to distal surface 127 may increase and/or a distance 121 between adjacent arms 124 may increase, thereby increasing length L1 and translating support bar 126 axially in the positive Z direction.

Arms 124 may also keep distal surface 127 of support bar 126 axially aligned with distal end 119 of bristles 118. Distal surface 127 being axially aligned with distal end 119 of bristles 118 may reduce or eliminate unsupported bristle overhang. Stated differently, arms 124 and support bar 126 being configured to extend from radially extending surface 132 of backing plate 120 to radially extending surface 130 of vane 102 may allow spring-loaded support plate 125 to support substantially an entire axial length of bristles 118. The reduction in unsupported bristle overhang tends to limit bristle deflection, in the radial direction, caused by the pressure differential between airflow 112 and airflow 110. Limiting bristle deflection may reduce distortion of brush seal 116 and decrease a likelihood of leakage across the sealing interface.

Figure 4A:
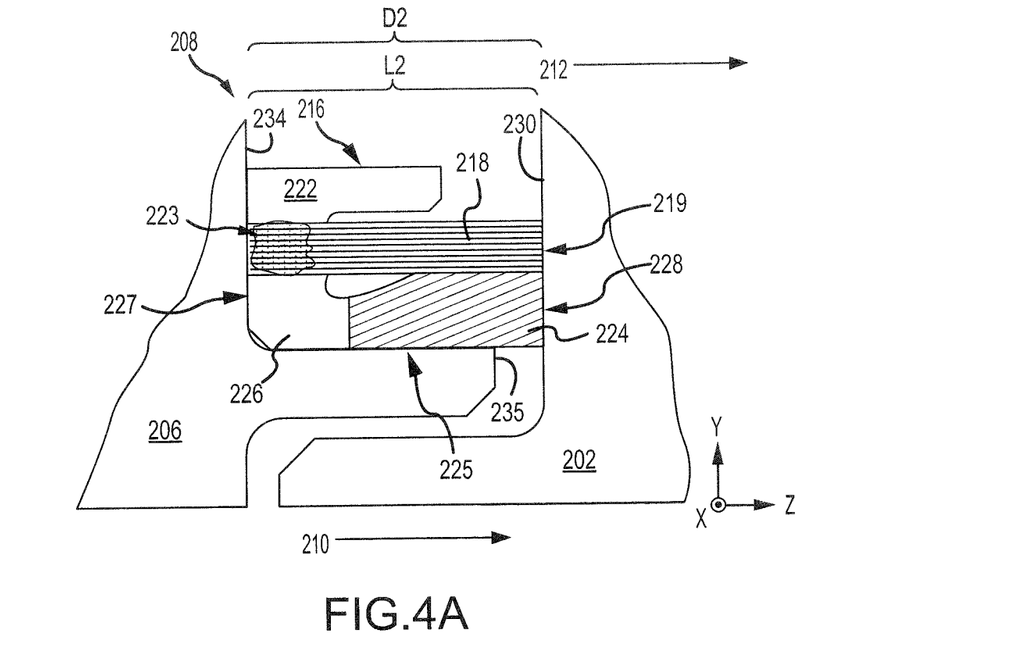
FIGS. 4A and 4B illustrate a brush seal having a spring-loaded support plate, in accordance with various embodiments.

With reference to FIG. 4A, a brush seal 216 disposed in a seal cavity 208 is illustrated, in accordance with various embodiments. With combined reference to FIGS. 2 and 4A, in various embodiments, brush seal 216 may be an annular split ring seal centered about axis of rotation A-A'. In various embodiments, brush seal 216 may be located on a BOAS 206 and may form a sealing interface (i.e. a sealing engagement) with a vane 202. Brush seal 216 may be configured to seal an airflow 210 flowing over vane 202 (e.g., core airflow C of FIG. 1) from an airflow 212 on the opposite, or radially outward, side of brush seal 216 (e.g., bypass airflow B of FIG. 1).

Brush seal 216 comprises a plurality of bristles 218, similar to bristles 118 in FIG. 3A, and a retention structure 222, similar to retention structure 122 in FIG. 3A. Brush seal 216 further comprises a spring-loaded support plate 225. In various embodiments, spring-loaded support plate 225 may serve as a backing plate. Spring-loaded support plate 225 is disposed radially inward of bristles 218 and may be located on BOAS 206. In various embodiments, retention structure 222, bristles 218, and spring-loaded support plate 225 may be welded or otherwise coupled to one another at a weld 223, similar to weld 123 in FIG. 3A. Retention structure 222, bristles 218, and spring-loaded support plate 225 may be welded or otherwise coupled at end of brush seal 216 that is distal to the sealing interface. Stated differently, the weld 223 joining retention structure 222, bristles 218, and spring-loaded support plate 225 may be located generally opposite a distal end 219 of bristles 218. Distal end 219 of bristles 218 may contact and form a sealing interface along a radially extending surface 230 of vane 202.

Figure 4B:
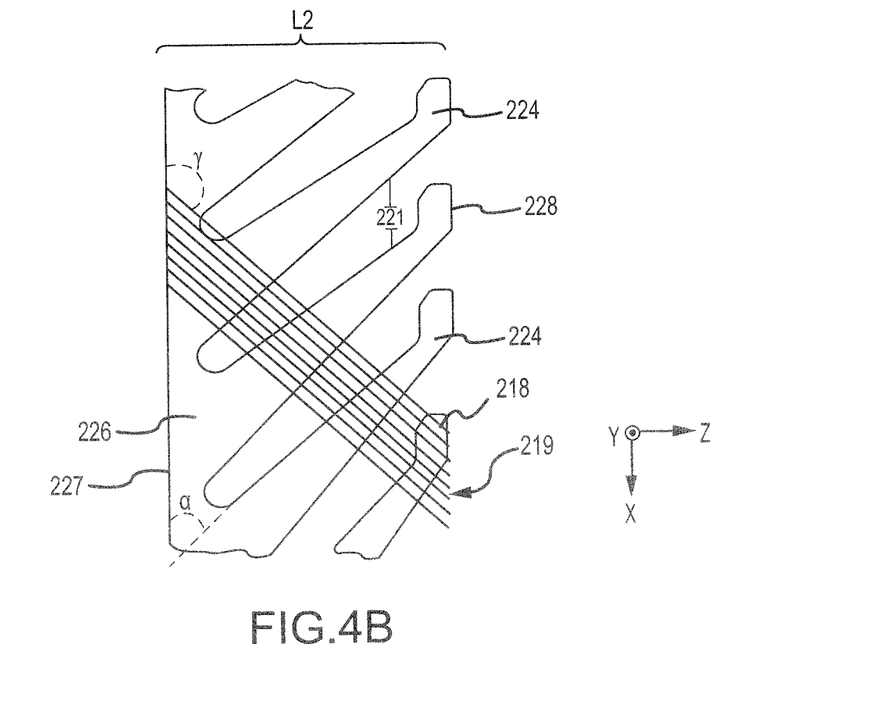

FIG. 4B shows a radially inward looking view of spring-loaded support plate 225. It should be understood that for clarity FIG. 4B shows only a portion of the bristles 218 located over spring-loaded support plate 225, and that bristles 218 may cover an entire circumference of spring-loaded support plate 225. Spring-loaded support plate 225 may comprise a support bar 226 and a plurality of arms 224 extending from support bar 226. Support bar 226 may be an annular and/or split ring structure. In various embodiments, support bar 226 may be coupled (e.g., welded) to bristles 218. Arms 224 may extend from support bar 226 in a generally axial direction (e.g., in the positive Z direction). Arms 224 may be integral to support bar 226. Stated differently, spring-loaded support plate 225, including support bar 226 and arms 224, may be cut, stamped, machined, molded, or otherwise formed from a single piece of metal, metal alloy, or other suitable material.

Spring-loaded support plate 225 comprises a length L2 extending from a proximal surface 227 of support bar 226 to a distal surface 228 of arms 224. Proximal surface 227 may be generally opposite distal surface 228. Arms 224 may be oriented at an angle alpha (α) relative to a proximal surface 227 of support bar 226. Bristles 218 may be oriented at an angle gamma (γ) relative to proximal surface 227. Angle γ may be selected to be different from angle α to avoid bristles 218 being aligned with the space or gaps between adjacent arms 224. For example, angle α may be less than 90 degrees and angle γ may be greater than 90 degrees. In various embodiments, angle α may be between 85 degrees and 40 degrees, and angle γ may be between 95 degrees and 150 degrees.

With combined reference to FIGS. 4A and 4B, a portion of arms 224, opposite support bar 226, may be located proximate a distal surface 235 of BOAS 206 and may span, at least, a portion of the space or gap between distal surface 235 of BOAS 206 and radially extending surface 230 of vane 202. Distal surface 228 of arms 224 may contact radially extending surface 230 of vane 202. Proximal surface 227 of support bar 226 may contact a radially extending surface 234 of BOAS 206. In this regard, spring-loaded support plate 225 may extend from radially extending surface 234 of BOAS 206 to radially extending surface 230 of vane 202.

In response to a translation and/or thermal expansion of BOAS 206 and/or vane 202, a distance D2 between radially extending surface 234 of BOAS 206 and radially extending surface 230 of vane may decrease. As distance D2 decreases, an interface between vane 202 and distal surface 228 of arms 224 forces arms 224 toward support bar 226 and radially extending surface 234 of BOAS 206. As arms 224 translate toward support bar 226, arms 224 bend and/or compress so that length L2 of spring-loaded support plate 225 decreases. For example, as D2 decreases, the angle α of arms 224 relative to proximal surface 227 may decrease and/or a distance 221 between adjacent arms 224 may decrease, thereby decreasing length L2.

Arms 224 may be configured to apply a biasing load in a direction toward radially extending surface 230 of vane 202. In this regard, arms 224 may be configured to keep distal surface 228 in contact with radially extending surface 230 of vane 202. For example, as distance D2 increases, arms 224 may naturally unbend and/or decompress so that length L2 of spring-loaded support plate 225 increases and distal surface 228 is forced toward radially extending surface 230 of vane 202. Stated differently, as D2 increases, the angle α of arms 224 relative to proximal surface 227 may increase and/or distance 221 between adjacent arms 224 may increase, thereby increasing length L2 and translating distal surface 228 axially in the positive Z direction.

Arms 224 may also be configured to keep distal surface 228 axially aligned with distal end 219 of bristles 218. Distal surface 228 of arms 224 being axially aligned with distal end 219 of bristles 218 may reduce or eliminate unsupported bristle overhang. Stated differently, support bar 226 and arms 224 being configured to extend from radially extending surface 234 of BOAS 206 to radially extending surface 230 of vane 202 may allow spring-loaded support plate 225 to support substantially an entire axial length of bristles 218. The reduction in unsupported bristle overhang tends to limit bristle deflection, in the radial direction, caused by the pressure differential between airflow 212 and airflow 210. Limiting bristle deflection may reduce distortion of brush seal 216 and decrease a likelihood of leakage across the sealing interface.

Figure 5A:
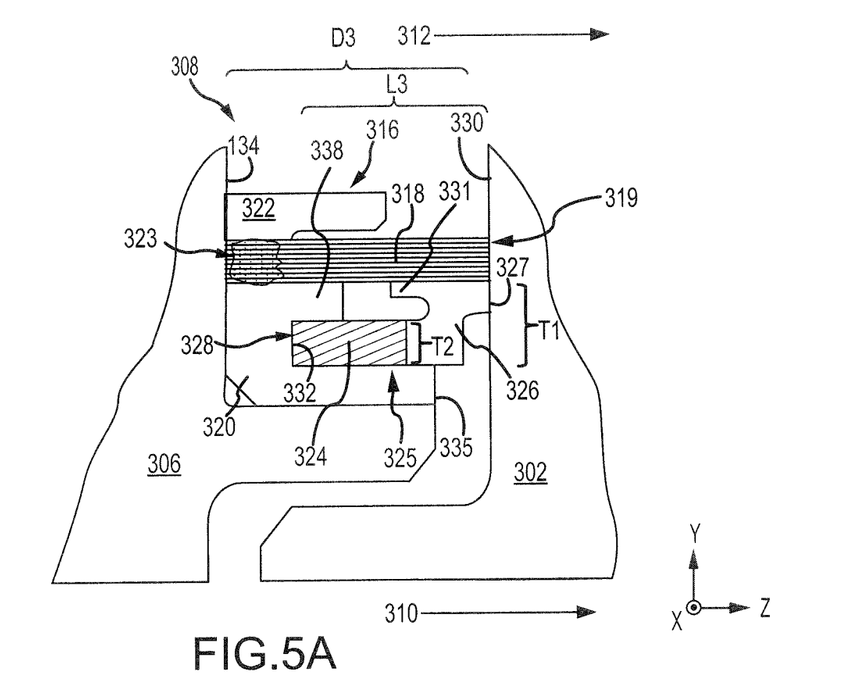
FIGS. 5A and 5B illustrate a brush seal having backing plate with spring-loaded support plate, in accordance with various embodiments.

With reference to FIG. 5A, a brush seal 316 disposed in seal cavity 308 is illustrated, in accordance with various embodiments. Brush seal 316 may be similar to brush seal 116 in FIG. 3A. With combined reference to FIGS. 2 and 5A, in various embodiments, brush seal 316 may be an annular split ring seal centered about axis of rotation A-A'. In various embodiments, brush seal 316 may be located on a BOAS 306 and may form a sealing interface (i.e., be in a sealing engagement) with a vane 302. Brush seal 316 may be configured to seal an airflow 310 flowing over vane 302 (e.g., core airflow C of FIG. 1) from an airflow 312 on the opposite, or radially outward, side of brush seal 316 (e.g., bypass airflow B of FIG. 1).

Brush seal 316 comprises a plurality of bristles 318, similar to bristles 118 in FIG. 3A, a retention structure 322, similar to retention structure 122 in FIG. 3A, and a backing plate 320, similar to backing plate 120 in FIG. 3A. In various embodiments, retention structure 322, bristles 318, and backing plate 320 may be welded or otherwise coupled to one another at a weld 323, similar to weld 123 in FIG. 3A. Retention structure 322, bristles 318, and backing plate 320 may be welded or otherwise coupled at end of brush seal 316 that is distal to the sealing interface. Stated differently, the weld 323 joining retention structure 322, bristles 318, and spring-loaded support plate 325 may be located generally opposite a distal end 319 of bristles 318. Distal end 319 of bristles 218 may contact and form a sealing interface along a radially extending surface 330 of vane 302.

Figure 5B:
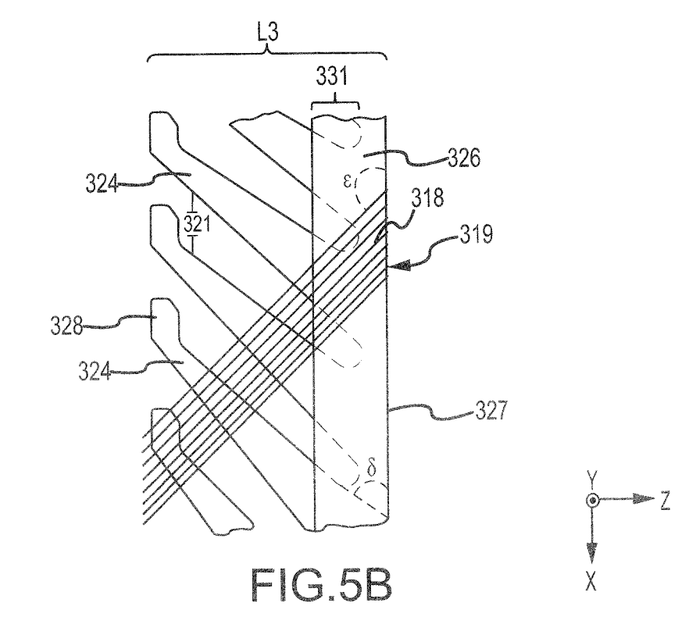

Brush seal 316 further comprises a spring-loaded support plate 325. Spring-loaded support plate 325 may be located over backing plate 320 such that spring-loaded support plate 325 is between backing plate 320 and bristles 318. FIG. 5B shows a radially inward looking view of spring-loaded support plate 325. It should be understood that for clarity FIG. 5B shows only a portion of the bristles 318 located over spring-loaded support plate 325, and that bristles 318 may cover an entire circumference of spring-loaded support plate 325.

Spring-loaded support plate 325 may comprise a support bar 326 and a plurality of arms 324 extending from support bar 326. Support bar 326 may be an annular and/or split ring structure. Arms 324 may extend from support bar 326 in a generally axial direction (e.g., in the negative Z direction). Arms 324 may be integral to support bar 326. Stated differently, spring-loaded support plate 325, including support bar 326 and arms 324, may be cut, stamped, machined, molded, or otherwise formed from a single piece of metal or metal alloy.

Spring-loaded support plate 325 may comprise a length L3 extending from a proximal surface 328 of arms 324 to a distal surface 327 of support bar 326. Proximal surface 328 may be generally opposite distal surface 327. Arms 324 may be disposed at an angle delta (δ) relative to a distal surface 327 of support bar 326. Bristles 318 may be oriented at an angle epsilon (ε) relative to distal surface 327. Angle ε may be selected to be different from angle δ to avoid bristles 318 being aligned with the space or gaps between adjacent arms 324. For example, angle δ may be less than 90 degrees and angle ε may be greater than 90 degrees. In various embodiments, angle δ may be between 85 degrees and 40 degrees, and angle ε may be between 95 degrees and 150 degrees.

With combined reference to FIGS. 5A and 5B, in various embodiments, a radial thickness T1 of support bar 326 may be greater than a radial thickness T2 of arms 324 such that a portion of support bar 326 extends radially outward from arms 324. In various embodiments, a radially outward portion 331 of support bar 326 may radially overlap arms 324. In various embodiments, a portion 338 of backing plate 320 may radially overlap arms 324. Stated differently, portion 338 of backing plate 320 may be located between bristles 318 and arms 324.

Support bar 326 may be located proximate a distal surface 335 of backing plate 320 and may span, at least, a portion of the space or gap between distal surface 335 of backing plate 320 and radially extending surface 330 of vane 302. Distal surface 327 of support bar 326 may contact radially extending surface 330 of vane 302. A proximal surface 328 of arms 324 may contact a radially extending surface 332 of backing plate 320. In this regard, spring-loaded support plate 325 may extend from radially extending surface 332 of backing plate 320 to radially extending surface 330 of vane 302.

In response to translation and/or thermal expansion of BOAS 306 and/or vane 302, a distance D3 between radially extending surface 334 of BOAS 306 and radially extending surface 330 of vane 302 may decrease. As distance D3 decreases, an interface between vane 302 and distal surface 327 of support bar 326 forces support bar 326 toward radially extending surface 332 of backing plate 320. As support bar 326 translates toward radially extending surface 332, arms 324 bend and/or compress so that length L3 of spring-loaded support plate 325 decreases. For example, as D3 decreases, the angle δ of arms 324 relative to distal surface 327 may decrease and/or a distance 321 between adjacent arms 324 may decrease, thereby decreasing length L3.

Arms 324 may be configured to apply a biasing load to support bar 326. Arms 324 may apply a biasing load to support bar 326 in a direction toward radially extending surface 330 of vane 302. In this regard, arms 324 may keep distal surface 327 of support bar 326 in contact with surface 330 of vane 302. For example, as distance D3 increases, arms 324 may naturally unbend and/or decompress so that length L3 of spring-loaded support plate 325 increases and support bar 326 is forced toward surface 330 of vane 302. Stated differently, as D3 increases, the angle δ of arms 324 relative to distal surface 327 may increase and/or distance 321 between adjacent arms 324 may increase, thereby increasing length L3 and translating support bar 326 axially in the positive Z direction.

Arms 324 may configured to keep distal surface 327 of support bar 326 axially aligned with distal end 319 of bristles 318. Distal surface 327 being axially aligned with distal end 319 of bristles 318 may reduce or eliminate unsupported bristle overhang. Stated differently, arms 324 and support bar 326 being configured to extend from radially extending surface 332 of backing plate 320 to radially extending surface 330 of vane 302 may allow spring-loaded support plate 325 to support substantially an entire axial length of bristles 318. The reduction in unsupported bristle overhang tends to limit bristle deflection, in the radial direction, caused by the pressure differential between airflow 312 and airflow 310. Limiting bristle deflection may reduce distortion of brush seal 316 and decrease a likelihood of leakage across the sealing interface.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

No claim element is intended to invoke 35 U.S.C. 1 12(f), unless the element is expressly recited using the phrase "means for." As used herein, the terms "comprises", 'comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brush seal for a gas turbine engine, comprising:
   a plurality of bristles;
   a backing plate coupled to the plurality of bristles; and
   a spring-loaded support plate located on an axially extending surface of the backing plate such that the spring-loaded support plate is located between the backing plate and the plurality of bristles, the spring-loaded support plate comprising:
      a support bar, and
      a plurality of arms extending from the support bar and configured to apply a biasing load to the support bar, wherein the plurality of bristles contacts the plurality of arms, and wherein a proximal surface of the plurality of arms contacts a radially extending surface of the backing plate.

2. The brush seal of claim 1, wherein the support bar is located proximate a distal surface of the backing plate.

3. The brush seal of claim 1, wherein the plurality of arms are disposed at an angle of less than 90 degrees relative to a surface of the support bar and wherein the plurality of bristles are disposed at an angle of greater than 90 degrees relative to the surface of the support bar.

4. The brush seal of claim 1, wherein a distal surface of the support bar is aligned axially with a distal end of the plurality of bristles.

5. The brush seal of claim 1, further comprising a retention structure coupled to the backing plate and the plurality of bristles, wherein the plurality of bristles is located between the retention structure and the spring-loaded support plate.

6. A gas turbine engine, comprising:
   a vane;
   a blade axially adjacent to the vane;
   a blade outer air seal (BOAS) disposed radially outward of the blade; and
   a brush seal disposed in a seal cavity defined, at least partially, by the vane and the BOAS, the brush seal comprising:
      a spring-loaded support plate comprising a support bar and a plurality of arms extending from the support bar, and
      a plurality of bristles located over the spring-loaded support plate, wherein the plurality of bristles are coupled to the support bar, and wherein a distal surface of the plurality of arms is axially aligned with a distal end of the plurality of bristles, and wherein the distal surface of the plurality of arms and the distal end of the plurality of bristles contact a surface of the vane, and wherein the support bar contacts a radially extending surface of the BOAS.

7. The gas turbine engine of claim 6, wherein the plurality of arms are disposed at an angle of less than 90 degrees relative to a surface of the support bar, and wherein the plurality of bristles are disposed at an angle of greater than 90 degrees relative to the surface of the support bar.

8. The gas turbine engine of claim 6, further comprising a retention structure coupled to the spring-loaded support plate and the plurality of bristles, wherein the plurality of bristles is located between the retention structure and the spring-loaded support plate.

9. A gas turbine engine, comprising:
a vane;
a blade axially adjacent to the vane;
a blade outer air seal (BOAS) disposed radially outward of the blade; and
a brush seal disposed in a seal cavity defined, at least partially, by the vane and the BOAS, the brush seal comprising:
a spring-loaded support plate comprising a support bar and a plurality of arms extending from the support bar,
a plurality of bristles located over the spring-loaded support plate, and
a backing plate coupled to the plurality of bristles, wherein a distal surface of the support bar is axially aligned with a distal end of the plurality of bristles, and wherein the distal surface of the support bar and the distal end of the plurality of bristles contact a surface of the vane, and wherein a proximal surface of the plurality of arms contacts a radially extending surface of the backing plate.

10. The gas turbine engine of claim 9, wherein a portion of the backing plate is located between the plurality of bristles and the plurality of arms.

11. A brush seal, comprising:
a spring-loaded support plate comprising a support bar and a plurality of arms extending from the support bar, wherein the spring-loaded support plate is configured such that a distance between adjacent arms of the plurality of arms decreases in response to a decrease in an axial length of the spring-loaded support plate;
a plurality of bristles located over the spring-loaded support plate; and
a backing plate coupled to the plurality of bristles, wherein the spring-loaded support plate is located on the backing plate, and wherein the plurality of bristles contacts the plurality of arms, and wherein a proximal surface of the plurality of arms contacts a radially extending surface of the backing plate.

12. The brush seal of claim 11, wherein a distal surface of the support bar is axially aligned with a distal end of the plurality of bristles.

13. The brush seal of claim 11, wherein a portion of the backing plate is located between the plurality of bristles and the plurality of arms.

14. The brush seal of claim 13, wherein a radial thickness of the support bar is greater than a radial thickness of the plurality of arms.

15. The brush seal of claim 14, wherein a portion of the support bar radially overlaps the plurality of arms.

* * * * *